Nov. 13, 1951   M. L. EDWARDS   2,575,315
LUBRICANT FOAM CONTROL SYSTEM FOR ENGINES
Filed May 23, 1945   3 Sheets-Sheet 2
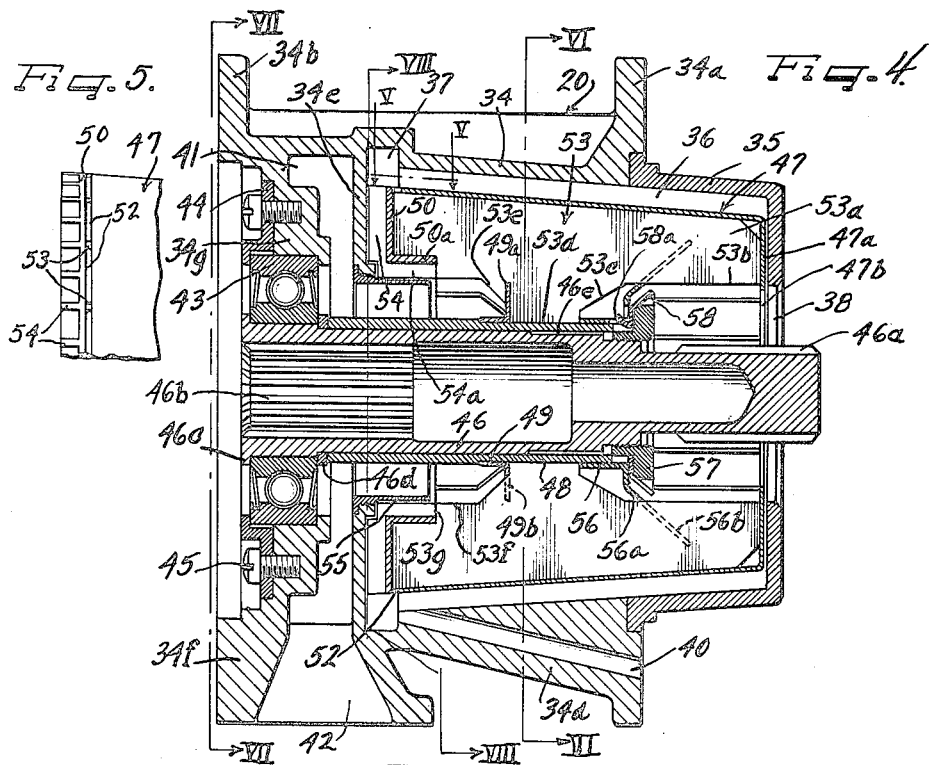
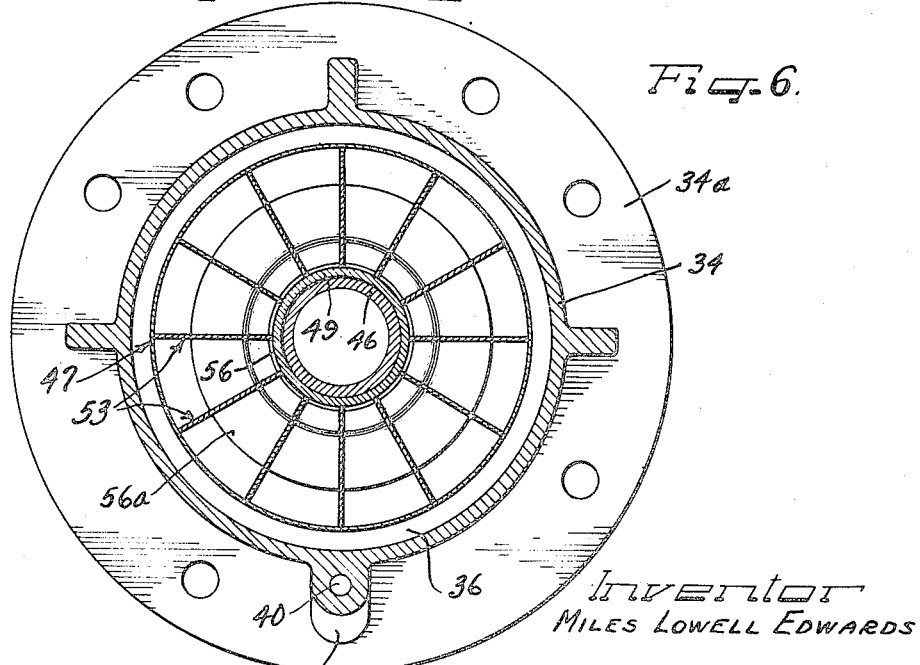
Inventor
MILES LOWELL EDWARDS
by The Firm of Charles Hills Attys.

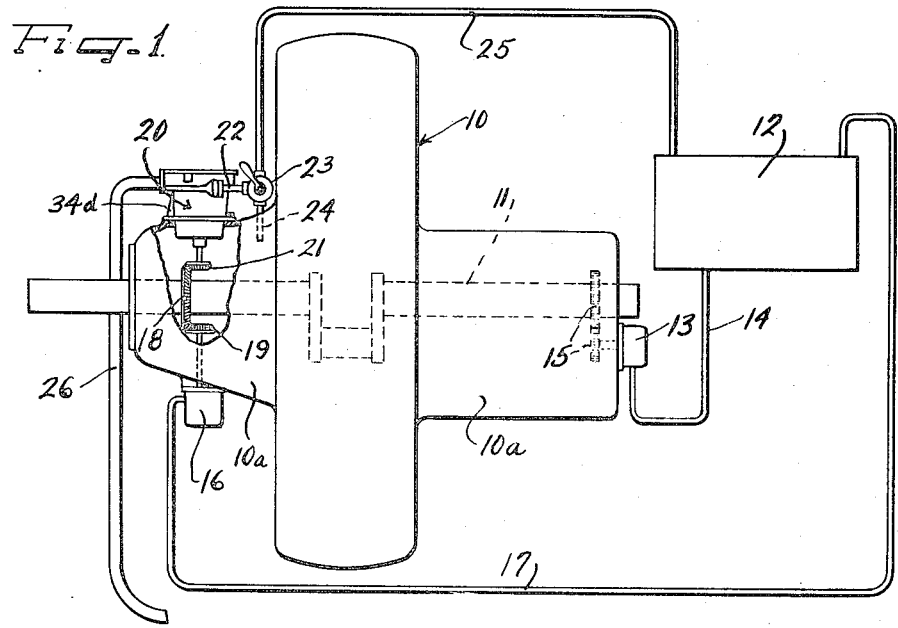
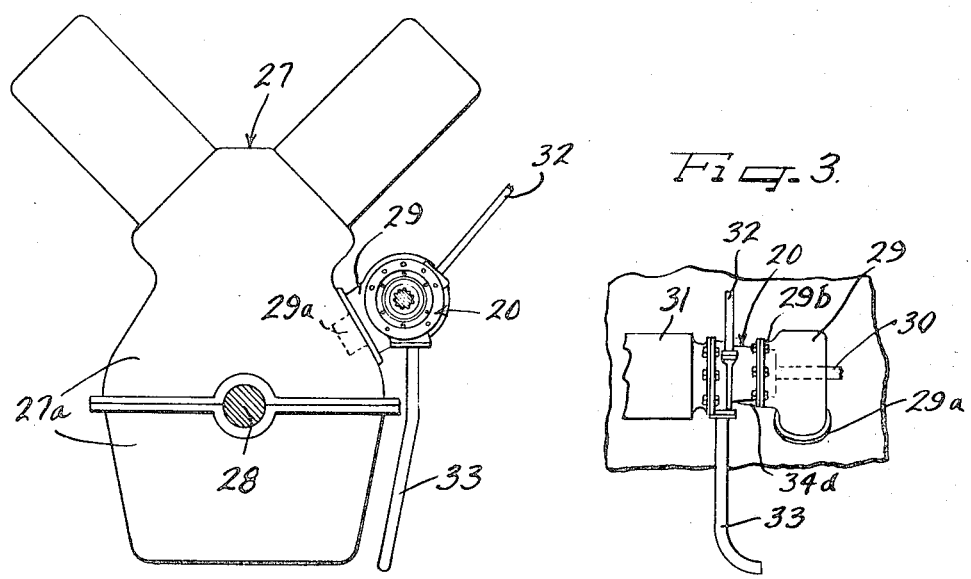

Nov. 13, 1951 M. L. EDWARDS 2,575,315
LUBRICANT FOAM CONTROL SYSTEM FOR ENGINES
Filed May 23, 1945 3 Sheets-Sheet 3
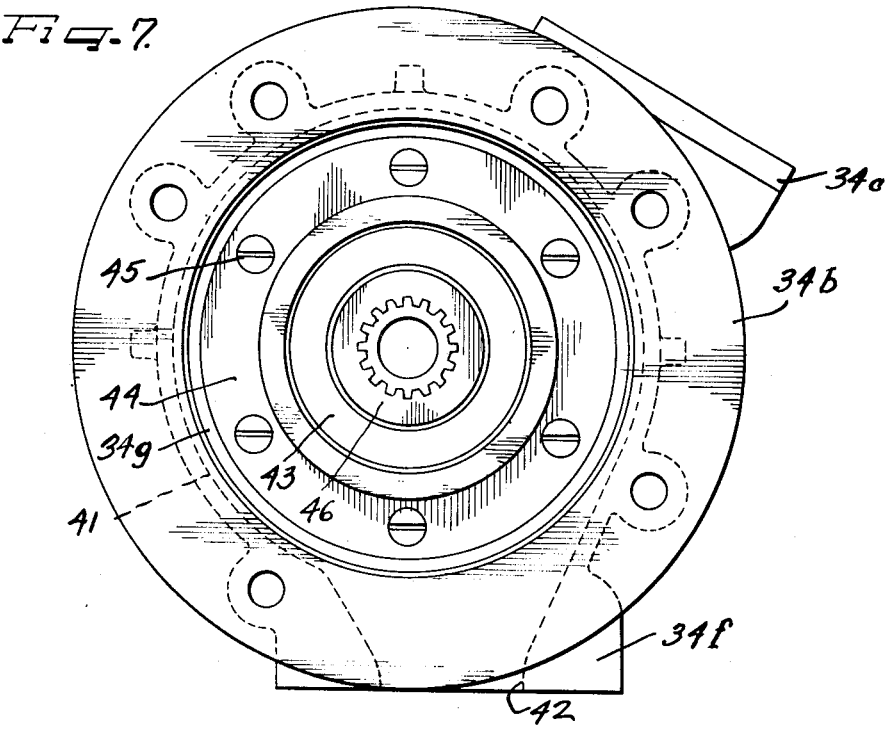
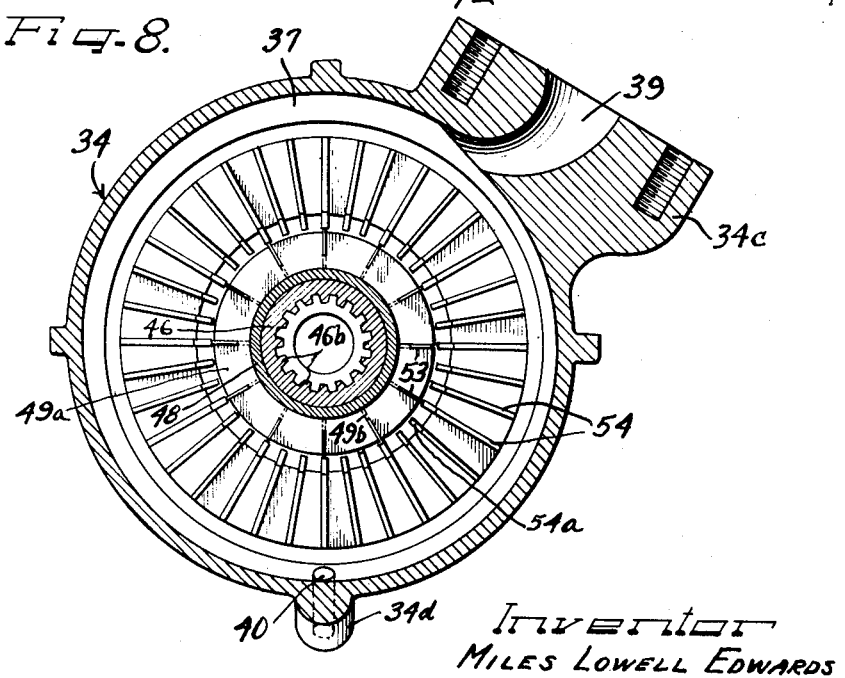
Inventor
MILES LOWELL EDWARDS Patented Nov. 13, 1951

2,575,315

UNITED STATES PATENT OFFICE 2,575,315

LUBRICANT FOAM CONTROL SYSTEM FOR ENGINES

Miles Lowell Edwards, Longview, Wash.

Application May 23, 1945, Serial No. 595,467

5 Claims. (Cl. 123—196)

This invention relates to the separation of foam into its constituent gaseous and liquid components, and particularly relates to the control of foaming lubricant in engines and the like.

The invention will be hereinafter specifically described in connection with aircraft engines, but it should be understood that the principles of this invention are generally applicable to the reduction or breaking of foam for reclaiming at least the liquid component of the foam.

Considerable difficulty has been experienced in connection with the oil systems of high altitude aircraft engines due to foaming of the oil or other lubricant, caused by expansion of entrained air and vaporization of volatiles in the oil. Gas and vapor bubbles are released from the lubricant due to reduced ambient air pressures when operating at high altitudes, as well as elevated temperatures created by the engine. These bubbles are encased in thin films of the liquid lubricant and create foam which tends to spew out of the vents provided in the oil system. In addition, this foam cannot be efficiently pumped and, in some instances, causes the pumps of the oil system to become gas-bound thereby resulting in failure of the lubrication system for the engine.

In accordance with this invention, the lubricant systems for engines are equipped with foam-reducing devices which separate foam into its constituent gaseous and liquid components. These devices have separate gaseous and liquid outlets with the gaseous outlet forming the vent for the lubricant system, and with the liquid outlet returning the reclaimed fully liquid lubricant to the system. The devices of this invention comprise a rotor having an axial inlet, a peripheral liquids outlet, and an axial gaseous material outlet. The rotor contains vanes for centrifugally whirling the foam to create a centrifugal force tending to crush the foam bubbles and centrifugally throw the liquid component outwardly from the gaseous component. The liquid component is centrifugally discharged through the peripheral outlet of the rotor into a pumping chamber or volute provided by a casing surrounding the rotor. The lighter gaseous material is discharged through the axial outlet of the rotor into an annular chamber having a peripheral outlet separate from the outlet for the liquids pumping chamber or volute.

The rotor is preferably equipped with a baffle adjacent the axial inlet thereof for directing the foam toward the periphery of the rotor to insure centrifugal whirling and to prevent axial flow of foam through the rotor. Radial vanes are provided on the rotor adjacent the periphery discharge outlet to prevent leakage of the liquid in the pumping chamber or volute back into the rotor.

The devices of this invention are preferably arranged with a drive shaft that can be coupled at either end to a driving member, and can transmit power from this driving member to another driven member. The casing for the device is preferably formed with mounting flanges on both ends thereof so that the device can be incorporated between driving and driven parts with the shaft of the device transmitting power from the driving to the driven device.

It is, then, an object of this invention to provide engines having lubricant-receiving crank cases with foam-reducing devices forming a vent for the crank cases and arranged to centrifugally separate any foam received therein into its constituent components while returning the lubricant components back to the oil system of the engine.

A further object of this invention is to provide oil systems for engines wherein oil foam is reduced into its component liquid lubricant and gaseous parts, and wherein the liquid lubricant part is returned to the engine.

Another object of this invention is to provide a foam-reducer venting device for engine crank cases or the like.

A still further object of this invention is to provide a gas-liquid separator of the centrifugal type wherein the liquid component is centrifugally pumped out of the device after it has been separated from the gaseous component of the lubricant.

A specific object of the invention is to provide a gas-liquid separator with a rotating chamber having an axial inlet, a peripheral liquids outlet, and an axial gas outlet.

A still further object of this invention is to provide a foam reducer of the centrifugal type adapted to be mounted on an engine between driving and driven parts of the engine.

A still further object of the invention is to provide a method of controlling foam in engine lubricating systems wherein the liquid lubricant component of the foam is returned to the system and wherein the gaseous component of the foam is vented to the ambient air.

A still further object of this invention is to provide a lubricant system for an engine with an engine-driven foam reducer in the breather or vent passage of the system.

A further specific object of the invention is to provide a rotor for a gas-liquid separator which diverges from an axial inlet at one end thereof to a peripheral outlet at the other end thereof.

Another object of the invention is to provide an oil system for an engine with a foam reducer acting to separate foam into its component gaseous and liquid parts while pumping the liquid part back to the system and venting the gaseous part to the ambient air.

Other and further objects of this invention will be apparent to those skilled in the art from the following description of the annexed sheets of drawings which, by way of a preferred example only, illustrate one embodiment of this invention applied to radial and in-line engines.

On the drawings:

Figure 1 is a somewhat diagrammatic side elevational view of a radial aircraft engine equipped with an oil system having an air-liquid separator in the breather passage thereof, and with parts broken away to show underlying parts.

Figure 2 is a somewhat diagrammatic front end elevational view of an in-line engine having an oil system equipped with a gas-liquid separator of this invention in the breather passage thereof.

Figure 3 is a fragmentary side elevational view of a portion of the assembly shown in Figure 2.

Figure 4 is an axial cross-sectional view of the gas-liquid separator of this invention.

Figure 5 is a fragmentary elevational view of a portion of the rotor of the device shown in Figure 4 and taken along the line V—V of Figure 4.

Figure 6 is a transverse cross-sectional view taken along the line VI—VI of Figure 4.

Figure 7 is an end elevational view or plan view of the device of this invention taken along the line VII—VII of Figure 4.

Figure 8 is a transverse cross-sectional view taken along the line VIII—VIII of Figure 4.

As shown on the drawings:

As shown in Figure 1, the reference numeral 10 designates generally a radial aircraft engine driving a crankshaft 11. The engine 10 has a lubricating system receiving oil from a storage tank 12. An oil pump 13 pumps oil from the tank 12 through a conduit or tube 14 into the crankcase 10a of the engine 10. The pump 13 is driven from the crankshaft 11 as by means of gears 15.

An oil-scavenger pump 16 is mounted on the casing 10a to circulate oil from the crankcase back to the tank 12 through a pipe or tube 17. A gear 18 on the crankshaft 11 engages a gear 19 on the shaft of the scavenge pump 16 to drive the pump.

In accordance with this invention, an air-oil separator 20 is mounted on the upper portion of the casing 10a and has an axial inlet projecting into the casing to vent air in the casing to the atmosphere. The separator 20 has a rotor driven by a gear 21 engaging the same gear 18 that drives the scavenge pump 16.

A tube 22 connects the oil outlet port of the separator 20 with a valve 23 having outlet ports respectively receiving tubes 24 and 25. The tube 24 discharges the oil back into the casing 10a. The tube 25 discharges the oil into the tank 12. The valve 23 can be set so that oil is either drained back into the engine casing, or circulated back to the storage tank 12.

The air outlet for the separator 20 receives a tube 26 which opens into the slipstream of the aircraft (not shown) on which the engine is mounted. This tube 26 opens downstream to aid in circulating air through the separator, thereby providing a breather for the engine casing.

The air-oil separator 20 illustrated in the oil system for the engine 10 is effective for venting the engine casing 10a to the ambient air and for breaking up foam tending to flow through the breather or vent passage. The oil component of the foam is pumped by the device 20 either back to the engine casing or to the oil storage tank.

The device 20 is also readily mounted on in-line engines as shown in Figures 2 and 3, and, as illustrated, can be conveniently mounted between the generator and a drive shaft extending from a pump or other driven appurtenance of the engine. As shown in Figure 3, an in-line engine 27 has the crank shaft 28 thereof rotatably mounted in a crankcase 27a of the engine. A side wall of this crankcase 27a has a vent port or opening registering with an inlet port 29a of a hollow casing 29. This casing 29 has an outlet port 29b receiving the inlet end of the separator 20 therein. A pump or other engine-driven shaft 30 extends through the casing 29 and is coupled with the drive shaft of the separator 20. The separator 20 is bolted to the engine generator 31 and the shaft for the separator 20 transmits power from the shaft 30 to the generator shaft. The oil outlet for the separator 20 is connected to a tube 32 to return oil to the oil system for the engine 27. The air outlet for the separator 20 is connected through a breather pipe or tube 33 which, as shown, opens downstream under the engine 27.

The crankcase 27a for the engine is thus vented through the casing 29, separator 20, and breather pipe 33 but the separator removes liquid from the gaseous material flowing therethrough and returns this liquid back to the oil system for the engine.

From the above descriptions it is clear, therefore, that the separator 20 of this invention is readily adapted for mounting either on a radial engine or an in-line engine, and can be interposed between driving and driven members on the engine to transmit driving torque.

As shown in Figure 4, the separator 20 comprises a main casing 34 having circular mounting flanges 34a and 34b at the ends thereof and receiving a cap 35 in the flanged end 34a to cooperate therewith in defining a frusto-conical chamber 36. An annular pumping chamber 37 is provided in the casing 34 at the large end of the frusto-conical chamber 36. An axial inlet opening 38 is provided in the central portion of the cap 35 at the small end of the frusto-conical chamber 36. As best shown in Figures 7 and 8, the casing 34 has a peripheral boss 34c providing a discharge outlet 39 for the pumping chamber 37. A leg 34d (Figs. 4 and 8) provides an oil drain passageway 40 for the chamber 37. A partition wall 34e is provided in the casing 34 forming an end wall for the chambers 36 and 37. An air chamber 41 is provided in the casing on the side of the partition wall 34e opposite the chamber 37. This chamber 41 has a peripheral outlet 42 provided in a boss 34f on the casing.

An end wall 34g on the casing provides a closure for the chamber 41 and a seat for a bearing 43. This bearing is retained in the seat by means of a ring 44 secured to the wall 34g by means of screws 45.

The bearing 43 rotatably supports a shaft 46 which extends axially through the casing 34 and aperture 38 of the cover 35. The end of the shaft 46 extending through the aperture 38 is externally splined at 46a while the opposite end of the shaft is internally splined as at 46b. The shaft is thus adapted to be coupled to driving and driven means.

As shown in Figure 4, the inner race ring for the bearing 43 is clamped between a shoulder 46c on the shaft and a collar 46d seated on the shaft. The bearing 43 thus rotatably supports the shaft 46 in the central portion of the casing 45 and the shaft projects through large openings in the partition wall 34e and end wall 34g of the casing.

A frusto-conical hollow rotor 47 is mounted in the casing 34 and cover 35 on the shaft 46. This rotor has a hollow hub 48 snugly engaging the shaft and abutting the collar 46d on the shaft. This hub 48 has a collar 49 secured thereon intermediate the ends thereof with an outturned flange 49a that is radially slotted at 49b at spaced intervals therearound as shown in Figure 8.

The hub 48 is drivingly connected to the shaft 46 by serrations 46e on the shaft meshed with internal serrations in the hub. The rotor casing 47 has an end wall 47a at the small end thereof with a central aperture 47b therethrough aligned with the opening 38. A face plate or ring 50 is welded to the ends of radial blades 53 which extend beyond the large end of the rotor casing 47 as best shown in Figure 5. These extended ends of the vanes 53 provide gaps or discharge ports 52 between the end of the casing 47 and the plate 50 aligned with the pumping chamber 37. The plate 50 has a depending collar or neck portion 50a extending into the large end of the rotor 47.

The radial rotor blades 53 are mounted in the rotor 47 and have outer end portions 53a extending from the rotor wall 47a to the plate 50. These outer end portions 53a have inner edges 53b spaced somewhat radially outward from the opening 47b in the end wall 47a of the rotor together with converging edge portions 53c merging into short blade portions 53d snugly fitted on the rotor hub 48 and seated in the slots 49b of the collar flange 49a. The blades 53 then have diverging edges 53e extending outwardly to the straight edge portions 53f. The edges 53f terminate in flat shoulders 53g abutted against the collar 50a of the end plate 50.

Radial vanes 54 are provided on the plate 50 and have close-running clearance relationship with the partition wall 34e of the casing 34. These radial vanes 54 have axial vane portions 54a on the neck or collar 50a of the plate 50 aligned flush with the blade edges 53f. A collar 55 is threaded into the partition wall 34e and projects to form a tube inside of the vane portions 54a in close-running clearance relationship therewith. The collar terminates in spaced relation from the shoulders 53g of the blades 53.

A collar 56 is mounted on the hub 48 in spaced opposed relation to the collar 49 and abuts the blade portions 53d. The opposite ends of these blade portions 53d are bottomed on the collar 49. The collar 56 has a skirt 56a diverging therefrom toward the rotor inlet 47b. This skirt 56aa is radially slotted as at 56b to receive the blade portions 53a and cooperate with the slotted flange 49a of the collar 49 to space and rigidfy the blades 53.

A nut 57 is threaded on the shaft 46 and a lock washer 58 is pressed by the nut against the collar 56. This collar 56 has a slot therein receiving a tang 58a on the lock washer to prevent the nut from loosening. As indicated above the serrations 46e on the shaft drive the hub 48.

In operation, the device 20 is mounted on a motor casing so that the inlet 38 thereof is adapted to receive oil foam. This foam enters the inlet 47b of the rotor 47. The shaft 46 is splined to some driven part of the motor to be rotated at high speed. Foam entering the rotor inlet 47b is deflected by the baffle skirt 56a into the path of the blades 53a whereupon centrifugal force will throw the heavier liquid component of the foam against the conical side wall of the rotor. The liquid will flow by centrifugal action to the large end of the conical rotor 47 where it is centrifugally discharged through the openings 52 into the pumping chamber 37. The impact of the centrifugally discharged oil at high velocity against the stationary walls of the pumping chamber 37 creates a vortex action which develops a pressure head for discharging the oil out of the peripheral outlet 39 and back to the oil system of the engine as described in connection with Figures 1 to 3.

The gaseous component of the foam, being lighter than the liquid, will gather close to the axial center of the rotor chamber to flow through the outlet tube 55 into the annular air chamber 41 from which it is discharged out of the peripheral outlet 42 into the breather discharge tubes 26 or 33 as described in Figures 1 to 3. The vanes 54 and 54a have close-running clearance with the partition wall 34e and discharge tube 55 which prevents leakage of air from the central portion of the rotor into the liquid pumping chamber 37 and likewise prevents back-flow of oil from this pumping chamber into the rotor.

The oil drain 40 is arranged for gravity drainage of oil out of the pumping chamber 37 when the engine is at rest to prevent loss of oil through the breather passageway. This drain passage 40 communicates with the crankcase of the engine for gravity drainage of oil back to the crankcase.

From the above descriptions it should be understood that this invention provides a foam breaker or foam reducer device for incorporation in the breather passage of a lubricant system for internal combustion engines and the like. The device of this invention is preferably driven by the internal combustion engine and includes a rotor which centrifugally separates foam into its constituent gaseous and liquid parts while actually pumping the liquid part back to the system. The gaseous component of the foam escapes to the ambient air surrounding the engine, and flow of the gaseous component can be induced by a slight suction created by the slipstream of the vehicle propelled by the engine. The devices of this invention minimize difficulties experienced with foam or froth formation in oil systems, preventing the loss of oil from such systems while still permitting the system to be vented, and insure a supply of fully liquid oil to the oil pumps of the system.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination with an engine having an oil-receiving crankcase, an oil supply tank for supplying oil to said crankcase, an oil pump driven by said engine for pumping oil from said tank into said crankcase, an oil scavenge pump driven by said engine for pumping oil out of said crankcase into said tank, an air-oil separator mounted on said crankcase having an inlet arranged to receive oil foam from the crankcase, a centrifugal air and oil separating rotor in said separator driven by said engine, an air outlet for said separator vented to the ambient air surrounding said engine, a separate oil outlet for said separator, and means for selectively returning separated oil from said outlet to said tank and said crankcase.

2. In combination with an engine having an oil system including an oil supply tank, a pump driven by the engine for feeding oil from said tank to said engine, and a second pump for returning oil from said engine to said tank, the improvement of an air-oil separator mounted on said engine having a centrifugal air and oil-separating rotor driven by said engine arranged to receive oil foam from the engine together with an air outlet for said rotor vented to the ambient air and an oil outlet for said rotor communicating with said tank.

3. In combination with an engine having an oil-receiving crankcase together with a generator alongside of said crankcase and an engine-driven shaft for driving said generator, the improvement of a hollow casing mounted on said crankcase having an inlet arranged to receive oil foam formed in the crankcase and an outlet aligned with said generator, an air and oil-separating device mounted between said casing and said generator, a centrifugal air and oil separating rotor in said device, a drive shaft for said rotor connected with said engine shaft and said generator to transmit driving torque from the engine shaft to the generator, and separate air and oil outlets for said device.

4. In combination, an engine having a crankcase, an engine-driven shaft alongside of said crankcase, a generator alongside of said crankcase, a hollow casing mounted on said crankcase having an inlet arranged to receive oil foam from the crankcase and an outlet aligned with said generator, an air and oil separator interposed between said casing and said generator, a drive shaft for said separator coupled with said engine shaft and said generator, an air and oil separating rotor driven by the shaft in said separator, an air outlet for said separator forming a vent for said crankcase, and an oil outlet for said separator receiving liquid oil from said rotor.

5. In combination with an engine having an oil receiving crankcase with an opening in the upper portion thereof, an air and oil separator mounted over said opening of said crankcase to form an air vent for the crankcase and to return oil direct to the crankcase from oil foam spewing into the separator, a centrifugal air and oil separating rotor in said separator, a central shaft rotatably mounting said rotor and extending through said opening into said crankcase, said rotor having a central axial flow path around said shaft for substantially unimpeded flow of air therethrough to provide an open vent for the crankcase, said rotor having a flow path for oil surrounding said central axial flow path and having a peripheral outlet communicating with the crankcase for direct return of oil to the crankcase, and means in said crankcase coupled with said shaft for driving the rotor of said separator.

MILES LOWELL EDWARDS.

REFERENCES CITED

The following references are of record in the file of this patent:

UNITED STATES PATENTS

| Number | Name | Date |
|---|---|---|
| 1,031,441 | Hansen | July 2, 1912 |
| 1,731,313 | Miller | Oct. 15, 1929 |
| 1,807,515 | Drysdale | May 26, 1931 |
| 2,024,336 | Cavanaugh | Dec. 17, 1935 |
| 2,417,747 | Flowers | Mar. 18, 1947 |